(12) United States Patent
Anastas et al.

(10) Patent No.: US 10,033,029 B2
(45) Date of Patent: Jul. 24, 2018

(54) BATTERY WITH INCREASED ENERGY DENSITY AND METHOD OF MANUFACTURING THE SAME

(71) Applicant: Apple Inc., Cupertino, CA (US)

(72) Inventors: George V. Anastas, San Carlos, CA (US); Gregory A. Springer, Los Altos, CA (US); Jack B. Rector, III, San Ramon, CA (US); Joshua R. Funamura, San Jose, CA (US); Kenneth M. Silz, Brentwood, CA (US)

(73) Assignee: Apple Inc., Cupertino, CA (US)

( * ) Notice: Subject to any disclaimer, the term of this patent is extended or adjusted under 35 U.S.C. 154(b) by 733 days.

(21) Appl. No.: 14/041,773

(22) Filed: Sep. 30, 2013

(65) Prior Publication Data

US 2014/0147742 A1     May 29, 2014

Related U.S. Application Data

(60) Provisional application No. 61/730,263, filed on Nov. 27, 2012.

(51) Int. Cl.
*H01M 4/02* (2006.01)
*H01M 4/04* (2006.01)
(Continued)

(52) U.S. Cl.
CPC ....... *H01M 4/0404* (2013.01); *H01M 4/0409* (2013.01); *H01M 4/76* (2013.01); *H01M 10/058* (2013.01); *H01M 10/0525* (2013.01)

(58) Field of Classification Search
CPC ......... H01M 4/04; H01M 4/0404; H01M 4/76
(Continued)

(56) References Cited

U.S. PATENT DOCUMENTS 3,655,455 A    4/1972    Jones
4,369,225 A    1/1983    Manabe et al.
(Continued)

FOREIGN PATENT DOCUMENTS

CN    101640968    2/2010
CN    101676845    3/2010
(Continued)

OTHER PUBLICATIONS

English translation of Chu, Chinese Patent No. CN1144017.*
(Continued)

*Primary Examiner* — Jeffrey T Barton
*Assistant Examiner* — Niki Bakhtiari
(74) *Attorney, Agent, or Firm* — Brownstein Hyatt Farber Schreck, LLP

(57) ABSTRACT

A battery core includes an anode electrode collector and a cathode current collector. The battery core is created by defining an anode solution cavity on an anode electrode collector; defining a cathode solution cavity on a cathode electrode collector; depositing an anode solution into the anode solution cavity; depositing a cathode solution into the cathode solution cavity; curing the anode solution within the anode solution cavity; and curing the cathode solution within the cathode solution cavity. The anode electrode collector and the cathode current collector may be combined in a sandwich configuration and may be separated by one or more separators.

19 Claims, 8 Drawing Sheets

(51) Int. Cl.
*H01M 4/76* (2006.01)
*H01M 10/0525* (2010.01)
*H01M 10/058* (2010.01)

(58) Field of Classification Search
USPC ........................................................ 429/211
See application file for complete search history.

(56) References Cited

U.S. PATENT DOCUMENTS

| | | |
|---|---|---|
| 5,134,046 A | 7/1992 | Chow et al. |
| 5,523,179 A | 6/1996 | Chu |
| 5,554,459 A | 9/1996 | Gozdz et al. |
| 5,561,004 A | 10/1996 | Bates et al. |
| 6,001,138 A * | 12/1999 | Dix .................. H01M 4/04 29/623.1 |
| 6,180,278 B1 * | 1/2001 | Prickett .................. H01M 4/04 429/49 |
| 6,200,634 B1 | 3/2001 | Johnsgard et al. |
| 6,319,631 B1 | 11/2001 | Bay et al. |
| 6,410,189 B1 | 6/2002 | Yamada et al. |
| 6,610,572 B1 | 8/2003 | Takei et al. |
| 6,713,987 B2 | 3/2004 | Krasnov et al. |
| 7,297,441 B2 | 11/2007 | Hatta et al. |
| 7,585,582 B2 | 9/2009 | Chen |
| 7,801,613 B2 | 9/2010 | Li et al. |
| 7,927,744 B2 | 4/2011 | Mizutani et al. |
| 7,931,989 B2 | 4/2011 | Klaassen |
| 7,935,439 B2 | 5/2011 | Kim |
| 7,939,195 B2 | 5/2011 | Salot et al. |
| 7,959,769 B2 | 6/2011 | Zhang et al. |
| 7,960,054 B2 | 6/2011 | Zhang et al. |
| 8,044,813 B1 | 10/2011 | Dembo |
| 8,153,301 B2 | 4/2012 | Jiang |
| 8,168,322 B2 | 5/2012 | Krasnov et al. |
| 8,431,264 B2 | 4/2013 | Neudecker et al. |
| 8,435,312 B2 | 5/2013 | Chen |
| 8,445,130 B2 | 5/2013 | Neudecker et al. |
| 8,518,583 B2 | 8/2013 | Mizuno et al. |
| 8,669,345 B2 | 3/2014 | Lee et al. |
| 8,679,674 B2 | 3/2014 | Liang et al. |
| 8,822,059 B2 | 9/2014 | Wang |
| 8,956,761 B2 | 2/2015 | Reynolds et al. |
| 8,993,172 B2 | 3/2015 | Upadhyaya |
| 9,209,451 B2 | 12/2015 | Fukushima |
| 9,911,947 B2 | 3/2018 | Hong |
| 2001/0008725 A1 * | 7/2001 | Howard .............. H01M 2/0404 429/94 |
| 2001/0032666 A1 | 10/2001 | Jenson et al. |
| 2002/0127362 A1 | 9/2002 | Jansen et al. |
| 2003/0180621 A1 * | 9/2003 | Matsumoto ......... H01M 4/0404 429/233 |
| 2005/0079418 A1 | 4/2005 | Kelley et al. |
| 2005/0153078 A1 | 7/2005 | Bentley et al. |
| 2005/0250010 A1 | 11/2005 | Kurihara et al. |
| 2006/0210880 A1 | 9/2006 | Howard et al. |
| 2008/0032236 A1 | 2/2008 | Wallace |
| 2009/0181303 A1 | 7/2009 | Neudecker et al. |
| 2009/0193649 A1 | 8/2009 | Niessen et al. |
| 2009/0208754 A1 | 8/2009 | Chu et al. |
| 2009/0214899 A1 | 8/2009 | Shakespeare et al. |
| 2009/0317708 A1 | 12/2009 | Brandl et al. |
| 2010/0035152 A1 | 2/2010 | Sastry et al. |
| 2010/0066683 A1 | 3/2010 | Chang et al. |
| 2011/0123844 A1 | 5/2011 | Bhardwaj et al. |
| 2011/0129594 A1 | 6/2011 | Kwak et al. |
| 2011/0177398 A1 | 7/2011 | Affinito et al. |
| 2011/0183183 A1 | 7/2011 | Grady et al. |
| 2011/0195271 A1 | 8/2011 | Zadesky et al. |
| 2011/0200868 A1 | 8/2011 | Klaassen |
| 2011/0294015 A1 | 12/2011 | Pirk et al. |
| 2011/0311876 A1 | 12/2011 | Sturgeon et al. |
| 2012/0078317 A1 | 3/2012 | Wang et al. |
| 2012/0251867 A1 | 10/2012 | Krasnov et al. |
| 2013/0029205 A1 | 1/2013 | Adams |
| 2013/0176654 A1 | 7/2013 | Wang et al. |
| 2014/0007418 A1 | 1/2014 | Song |
| 2014/0011067 A1 | 1/2014 | Baba et al. |
| 2014/0147731 A1 | 5/2014 | Anastas et al. |
| 2014/0147737 A1 | 5/2014 | Anastas et al. |
| 2014/0264915 A1 | 9/2014 | Huang et al. |
| 2014/0265915 A1 | 9/2014 | Huang et al. |
| 2014/0272190 A1 | 9/2014 | Huang et al. |
| 2014/0272541 A1 | 9/2014 | Huang et al. |
| 2014/0272560 A1 | 9/2014 | Huang et al. |
| 2014/0272561 A1 | 9/2014 | Huang et al. |
| 2014/0273890 A1 | 9/2014 | Huang et al. |
| 2015/0325862 A1 | 11/2015 | Song et al. |
| 2016/0064719 A1 | 3/2016 | Bushnell et al. |
| 2016/0093837 A1 | 3/2016 | Bushnell et al. |

FOREIGN PATENT DOCUMENTS

| | | |
|---|---|---|
| EP | 0792741 | 9/1997 |
| EP | 0975031 | 1/2000 |
| EP | 1804315 | 7/2007 |
| EP | 2105983 | 9/2009 |
| EP | 2481499 | 8/2012 |
| JP | 61032951 | 2/1986 |
| JP | 63314770 | 12/1988 |
| JP | 2013004173 | 1/2013 |
| JP | 2013021347 | 1/2013 |
| TW | I306319 | 2/2009 |
| TW | 201010094 | 3/2010 |
| TW | 201014020 | 4/2010 |
| TW | 201108441 | 3/2011 |
| TW | 201218494 | 5/2012 |
| WO | WO 08/007867 | 1/2008 |
| WO | WO 10/033609 | 3/2010 |
| WO | WO 12/086557 | 6/2012 |
| WO | WO 12/090929 | 7/2012 |
| WO | WO 12/114162 | 8/2012 |

OTHER PUBLICATIONS

Zhonghua et al., "Layered Cathode Materials Li [$Ni_xLi_{(1/3-2x/3)}Mn_{(2/3-x/d)}$]$O_2$ for Lithium-Ion Batteries," *Electrochemical and Solid-State Letters*, vol. 4, No. 11, 2001, pp. A191-A194.

International Search Report and Written Opinion dated Jan. 20, 2014, PCT/US2013/067894, 9 pages.

Taiwanese Office Action dated Jan. 20, 2015, 2015, TW 102141940, 9 pages.

* cited by examiner

BATTERY WITH INCREASED ENERGY DENSITY AND METHOD OF MANUFACTURING THE SAME

CROSS-REFERENCE TO RELATED APPLICATION

This application claims the benefit under 35 U.S.C. § 119(e) of U.S. Provisional Patent Application No. 61/730,263, filed Nov. 27, 2012, entitled "Battery with Increased Energy Density and Method of Manufacturing the Same," the entirety of which is incorporated by reference as if fully recited herein.

TECHNICAL FIELD

The present invention relates generally to batteries, and more specifically, to rechargeable batteries and methods of manufacturing rechargeable batteries.

BACKGROUND

Many components, especially electronic devices such as laptops, tablet computers, smart phones, and the like, use rechargeable batteries to provide power to one or more electronic components. A number of electronic devices may use lithium ion batteries as the power source as lithium ion batteries generally have an increased energy density (watts/liter) as compared to other types of batteries. However, as electronic components are become smaller, the current structure of the lithium ion batteries may limit the energy density that may be available for a particular size. For example, some lithium ion batteries are constructed in a "jelly roll" configuration where the anode and cathode are placed on a substrate, which is then rolled around itself to create the jelly roll. The jelly roll may then be placed within a pouch, which may be generally rectangular or square. In these configurations, portions of the internal cavity of the pouch may be wasted space, as the curved jelly roll may not fit tightly within the pouch. Thus, current lithium batteries may not have the maximum energy density for a particular size, as some of the space within the pouch may go unused.

As electronic components decrease in size, and subsequently the lithium ion batteries also decrease in size, the unused space defined within the pouches may represent a higher percentage of the total size of the lithium ion battery space.

SUMMARY

In some embodiments herein, a battery and a method for manufacturing the battery are disclosed. The battery may include stacked layers that may form the components of the battery (e.g., anode, cathode). In some embodiments, the stacked configuration may not have to be "rolled" together. Accordingly, the battery configuration may have little or no unused space when positioned within a cell or pouch, which may allow the battery to have an increased energy density for a similarly sized conventional jelly roll lithium ion battery.

DETAILED DESCRIPTION

Figure 1:
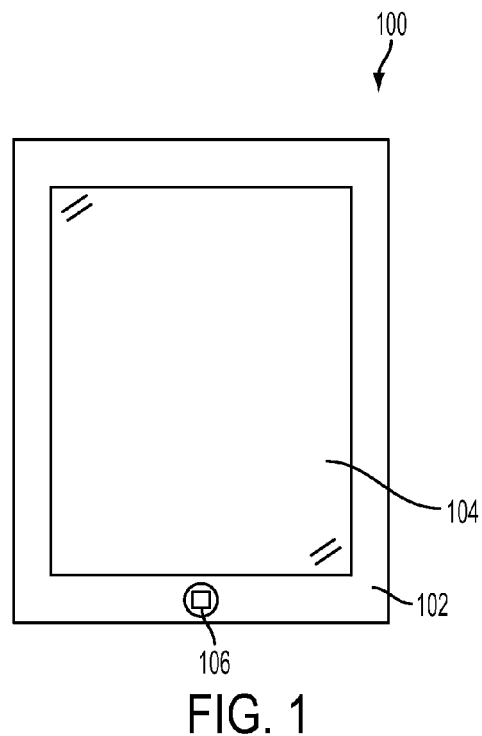
FIG. 1 is a front plan view of an illustrative electronic device incorporating a battery of the present disclosure.

The anode layer and a cathode layer of the battery may each have an increased thickness as compared to the anode and cathode layers for conventional lithium ion batteries. The increased thickness may provide an increase in efficiency of the battery with respect to the electrode potential of the cathode. This is because generally the electrode potential for the battery may related to the volume of the cathode as compared to the total volume of the cell. For example, energy density is generally watts per liter, and the volume of the cathode may be a proxy for watts, such that as the cathode fills more of the total cell volume (e.g., liters), the more watts may be produced by the cell. Additionally, the increased thickness may provide an increase in energy density as more of the volume of the battery cell may be dedicated to energy providing components, e.g., the anode and cathode.

In conventional lithium ion batteries, the thickness of the cathode and/or anode may be limited due to liquid or partially liquid form of the cathode and/or anode solutions when they are applied to the substrate or electrode collectors. For example, in many instances the cathode and anode solutions or mixtures may be applied to a substrate (e.g., electrode collector) in a "slurry" or partially liquid form. This liquid form may restrict the thickness of the application of the material on the substrate as prior to curing the slurry may roll or slide off of the substrate as the thickness is increased.

In some embodiments of the present disclosure, flow barriers and/or encapsulation walls may be used during manufacturing to provide a barrier to prevent the cathode and anode solutions from rolling off of the substrate. This manufacturing method may allow the cathode and anode solutions to be applied in thicker layers, which as mentioned above, may increase the energy density of the battery cell. For example, the flow barriers may include one or more walls extending above the substrate or may include one or more wells formed into the substrate and act to retain the anode or cathode slurries (e.g., LiCo slurry) within a solution cavity or well.

In some embodiments, the flow barriers may be defined by a mask on the substrate of either the cathode or anode. In other embodiments, the flow barriers may be defined by a ring-shaped wall or otherwise defined so as to provide a well or void space on top of the cathode base that can receive the anode and/or cathode solution slurries. The wall or barrier may removable after the slurry has hardened or may remain in position when the battery is assembled. The wall or barrier may be formed of a variety of materials which may be selected based on whether the wall or barrier may be removed. For example, in embodiments where the wall or barrier may be removable, the material selected may be easily etched or peeled away, but strong enough to retain the slurry on top of the substrate.

Once the flow barrier walls have been created, the anode and cathode mixtures may be poured or injected into a solution cavity or well defined by the flow barriers. Once the anode and cathode solutions are received into the solution cavity or well, the solutions may be baked or otherwise cured, with the flow barriers substantially preventing the slurries from escaping the solution cavity during baking. In other words, the flow barriers may substantially prevent the anode and cathode slurries from flowing off of the edge of a substrate or electrode collector. After the solutions have hardened, one or more protective walls or encapsulates may be formed around the anode and cathode. With the encapsulates in position, the anode and cathode may be combined in a sandwich configuration, with a separator positioned therebetween.

In other embodiments, the electrode collector or substrate may have a shape selected to generally match a surface where the battery may be inserted, e.g., a bottom surface of an enclosure for an electronic device. In these embodiments, the anode and/or cathode slurry may be injected into the cavity defined by the cured substrate. In these embodiments, the barrier or wall may be formed by the substrate as the substrate is molded. However, in other embodiments, the substrate may be molded to correspond to a surface of the enclosure of the device and a separate wall or barrier may be operably connected thereto (e.g., two shot injection molding process where a first injection shot forms a substrate and a second injection shot forms the barrier wall), which may then be used to contain the slurry.

Figure 2:
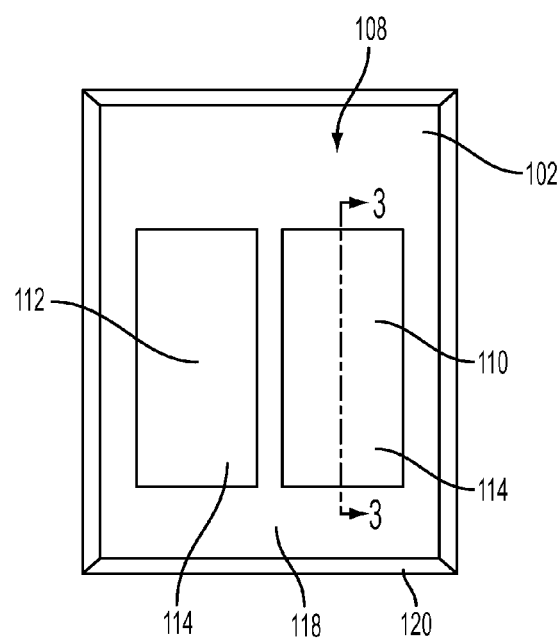
FIG. 2 is a front plan view of the electronic device with a top portion of the enclosure removed to illustrate the batteries within the enclosure cavity.

Turning now to the figures, an illustrative electronic device incorporating the battery will be discussed in further detail. FIG. 1 is a front plan view of an electronic device 100 incorporating one or more batteries. FIG. 2 is a front plan view of the electronic device 100 with a top enclosure and/or display removed. The electronic device 100 may include an enclosure 102, a screen 104, and/or one or more input/output buttons 106. The electronic device 100 may be substantially any type of electronic device, such as, but not limited to, a tablet computer, a laptop computer, a smart phone, a gaming device, or the like. The electronic device 100 may also include one or more internal components (not shown) typical of a computing or electronic device, such as, but not limited to, one or more processors, memory components, network interfaces, and so on.

The display 104 may be operably connected to the electronic device 100 or may be communicatively coupled thereto. The display 104 may provide a visual output for the electronic device 100 and/or may function to receive user inputs to the electronic device 100. For example, the display 104 may be a multi-touch capacitive sensing screen that may detect one or more user inputs.

As shown in FIG. 1, the enclosure 102 may form an outer surface and protective case for the internal components of the electronic device 100 and may at least partially surround the display 104. The enclosure 102 may be formed of one or more components operably connected together, such as a front piece and a back piece, or may be formed of a single piece operably connected to the display 104. With reference to FIG. 2, in some embodiments, the enclosure 102 may have a bottom surface 118 surrounded by an exterior wall 120 defining an enclosure cavity 108. The enclosure cavity 108 may be enclosed by a front portion of the enclosure (not shown) and/or the display 104. In these embodiments, the enclosure cavity 118 may be substantially sealed from the outer environment and provide a housing for one or more components of the electronic device 100.

In some embodiments, one or more battery cells 110, 112 may be received within the enclosure cavity 108 and operably connected to the enclosure 102. Although two battery cells 110, 112 are shown in some embodiments, the electronic device 100 may include only one battery cell 110, 112 or may include three or more battery cells. Additionally, each battery cell 110, 112 may be substantially the same or the battery cells may be different from each other (e.g., different sizes, energy densities, or types). It should be noted that although the battery cells 110, 112 are illustrated in FIG. 2 as being generally rectangular, many other dimensions and shapes are envisioned, such as but not limited to, geometric, non-geometric, or the like.

Figure 3A:
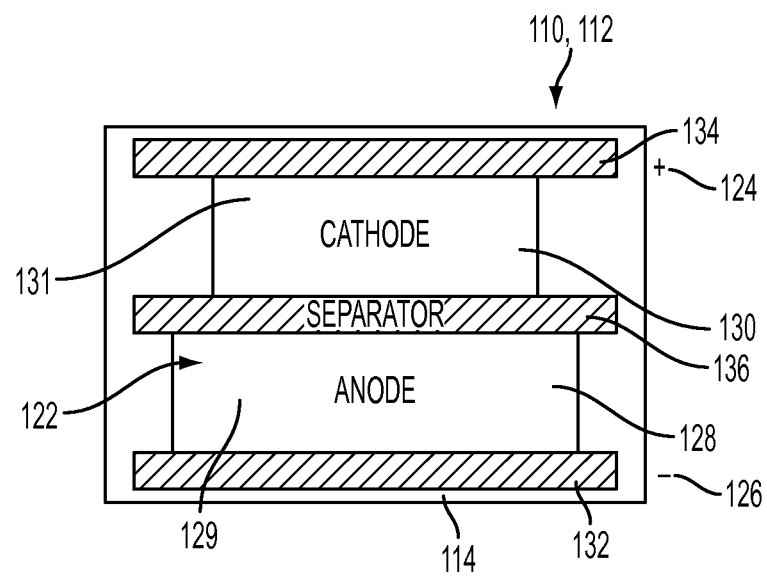
FIG. 3A is a cross-section view of one of the batteries illustrated in FIG. 2 taken along line 3-3 in FIG. 2.

Each battery cell 110, 112 may provide power to one or more components of the electronic device 100. FIG. 3A is a simplified cross-section view of one of the battery cells 110, 112 taken along line 3-3 in FIG. 2. It should be noted the battery cells 110, 112 may have similar internal components and so although the following discussion is made with respect to a first battery cell 110, it is equally applicable to the second battery cell 112. Each battery cell 110, 112 may include a housing 114 or pouch and a battery core 122. The housing 114 may generally enclose the battery core 122 and provide some protection and structure for the battery core 122.

A positive terminal 124 and a negative terminal 126 may extend through the housing 114 or otherwise be in communication with the battery core 122 while also being configured to be in communication with one or more external components (e.g., components of the electronic device 100). The terminals 124, 126 may transfer current from the battery core 122 to one or more components of the electronic device 100, as well as may transfer current to the core 122 from an external power source (such as when the battery cells 110, 112 are being charged).

A cathode electrode collector 134 may be in communication with the positive terminal 124. The cathode electrode collector 134 may be an electrically conductive material, such as aluminum. The cathode electrode collector 134 may be a relatively thin piece of material, such as an aluminum foil. The cathode electrode collector 134 may form a substrate or base on which a cathode 130 may be positioned.

The cathode 130 or positive electrode may be a layered oxide, such as lithium cobalt oxide ($LiCoO_2$), a polyanion, such as lithium iron phosphate, or a spinel, such as lithium manganese oxide. As will be discussed in more detail below, the cathode 130 may include a solution 131 having an active material (e.g., $LiCoO_2$), a conductive additive (e.g., carbon black, acetylene black, carbon fibers, graphite, etc.), a binder (such as polyvinylidene fluoride, ethylene-propylene, and a diene), and optionally a solvent. The binder acts to hold the active material and the conductive additive together, and in instances where the binder is non-water soluble the solvent (which may be a such as N-methypyrrolidone), acts to distribute the active material and conductive additive throughout the binder. It should be noted that the above examples of the cathode solution 131 are meant as illustrative only and many other conventional cathode materials may be used to form the cathode.

An anode electrode collector 132 may be in communication with the negative terminal 126. The anode electrode collector 132 may be a generally conductive material, such as copper. The anode electrode collector 132 may form a base or substrate for an anode 128. Similarly to the cathode electrode collector 134, the anode electrode connector 132 may be a relatively thin and/or flexible piece of material, such as a copper foil.

The anode 128 or negative electrode is generally the source of ions and electrons for the battery core 122. The anode 128 may include an anode solution 129 including an active material (e.g., lithium, graphite, hard carbon, silicon, or tin), a conductive additive (e.g., carbon black, acetylene black, or carbon fibers), a binder (such as polyvinylidene fluoride, ethylene-propylene, and a diene), and optionally a solvent.

A separator 136 may be positioned between the cathode 130 and the anode 128. The separator may be a fiberglass cloth or flexible plastic film (e.g., nylon, polyethylene, or polypropylene). The separator 136 separates the anode 128 and cathode 130 while allowing the charged lithium ions to pass between the anode 128 and cathode 130.

An electrolyte (not shown), which may be a mixture of organic carbonates such as ethylene carbonate or diethyl carbonate containing complexes of lithium ions. These nonaqueous electrolytes generally use non-coordinating anion salts such as lithium hexafluorophosphate ($LiPF_6$), lithium hexafluoroarsenate monohydrate ($LiAsF_6$), lithium perchlorate ($LiClO_4$), lithium tetrafluoroborate ($LiBF_4$), and lithium triflate ($LiCF_3SO_3$). The electrolyte may be filled into the anode 128 and/or cathode 130 around the anode and cathode solutions 129, 131. In some embodiments, the electrolyte may be saturated into the separator, such that as the separator is added to the core 122, the electrolyte may be added as well.

Figure 3B:
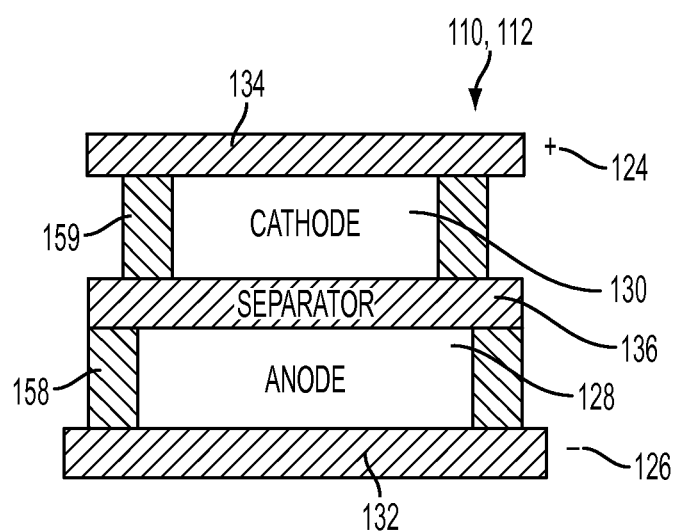
FIG. 3B is a cross-section view of one of the batteries including a protective or encapsulant around an anode and a cathode.

In some embodiments, the battery cells 110, 112 may include one or more flow barriers and/or encapsulation walls operably connected to either or both the cathode electrode collector 134 and the anode electrode collector 132. FIG. 3B is a simplified cross-section view of the battery cells 110, 112 with the housing 114 hidden for clarity. With reference to FIG. 3B, an encapsulation wall 159 may be operably connected to the cathode electrode collector 134. The cathode encapsulate 159 may span between the cathode electrode collector 134 and the separator 136. However, in some embodiments, the cathode encapsulate 159 may terminate prior to reaching the separator 136.

The cathode encapsulate 159 may bound either side of the cathode 130 and thus may contain the active material, the binder, and the conductive additive. In many embodiments, the encapsulate 159 may be formed during manufacturing and may replace one or more flow barriers that contain the cathode solution 131, this is discussed in more detail below with respect to FIG. 4.

An anode encapsulate 158 may be operably connected to the anode electrode collector 132 and may extend between the anode electrode collar 132 and the separator 136. Similarly to the cathode encapsulate 159, the anode flow encapsulate 158 may bound either side of the anode 128 and may be substantially any material that can prevent the anode 128 material from extending over the edges of the anode electrode collector 132. The anode encapsulate 158 may extend along the entire height or thickness of the anode 128 such that it abuts the separator 136 or may only extend along a portion of the length of the anode 128 and terminate prior to the bottom surface of the separator 136.

Figure 4:
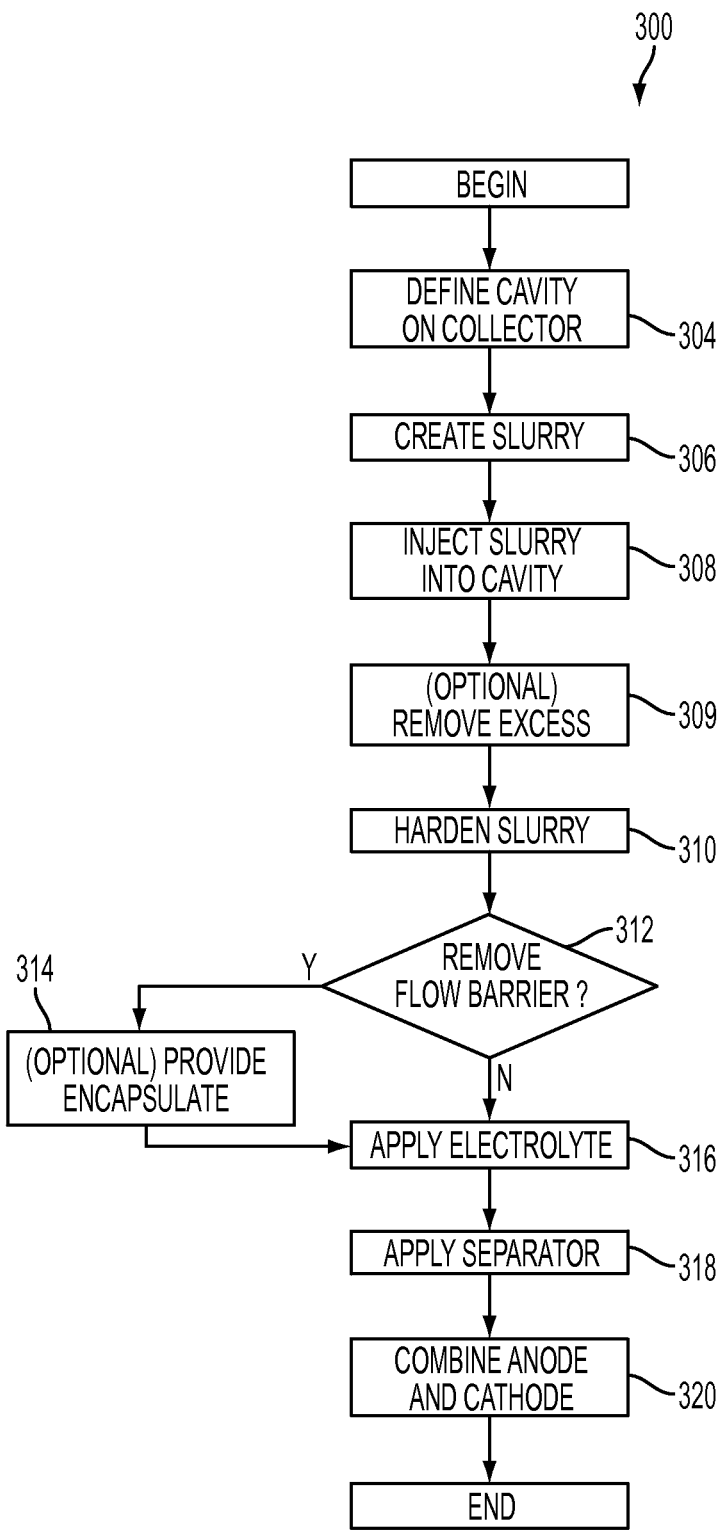
FIG. 4 is a flow chart illustrating a method for manufacturing the batteries of FIG. 2.

A method for manufacturing the battery core 122 will now be discussed in further detail. FIG. 4 is a flow chart illustrating a method 300 for creating the battery core 122. The method 300 may begin with operation 304 and a solution cavity may be defined on the electrode collectors 132, 134.

Figure 5A:
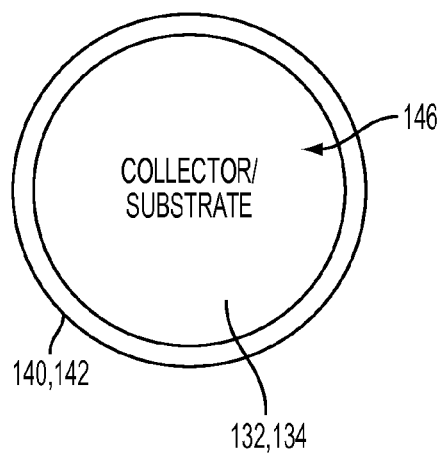
FIG. 5A is a top plan view of one of the elector collectors operably connected to one of the flow barriers.
Figure 5B:
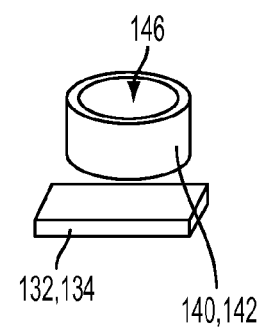
FIG. 5B is a simplified exploded view of the collector and the flow barrier.

With reference to FIGS. 5A and 5B, which illustrate various views of the electrode collector and a flow barrier 140, 142, a flow barrier 140, 142 may form a perimeter wall or retaining structure that may extend around an edge of the collectors 132, 134 to define a solution cavity 146 or well between the inner surface of the flow barrier 140, 142 and the top surface of the collectors 132, 134. For example, an anode flow barrier 142 and a cathode flow barrier 140 may be formed on respective electrode collectors 132, 134 to define the solution cavity 146 for each substrate or electrode collector 132, 134.

In some embodiments the flow barriers 140, 142 may be integrally formed with the electrode collectors 132, 134. For example, the flow barriers 140, 142 may be formed by folding or bending certain portions (e.g., the outer edges) of the electrode collectors 132, 134 upwards to define the solution cavity 146. In other embodiments, the flow barriers 140, 142 may be a separate component from the electrode collectors 132, 134 and may be operably connected thereto or positioned thereon. For example, in some embodiments, the flow barriers 140, 142 may be a plastic wall formed through masking deposition process, may be formed while the electrode collectors are formed (e.g., metal injection molding the electrode collectors to define one or more recesses or walls), or may otherwise be defined or connected to the electrode collectors.

In some embodiments, the flow barriers 140, 142 may extend upwards from the electrode collectors 132, 134. However, in other barriers, the solution cavity 146 may be defined as a well, e.g., through etching or otherwise forming recesses within the electrode collectors 140, 142. In these embodiments, the flow barriers 140, 142 may be formed integrally with the electrode collectors 132, 134.

It should be noted that although the flow barriers 140, 142 and the electrode collectors 132, 134 are illustrated as having a generally circular shape in FIGS. 5A and 5B, the shape of the electrode collector 134 and the flow barrier 140 may be modified as desired. For example, the electrode collector and the flow barrier 140 may be rectangular, square, other geometric or non-geometric shapes, or the like With reference again to FIG. 4, once the solution cavity 146 has been defined, the method 300 may proceed to operation 306. In operation 306 the anode 128 and cathode 130 slurries or solutions 129, 131 may be created. As briefly discussed above, the anode and cathode solutions 129, 131 may each include an active material, a binder, and a conductive material. For the anode 128, the active material may be lithium or graphite infused with lithium ions, the binder may be polyvinylidene fluoride, and the conductive additive may be carbon black. For the cathode 130, the active material may be $LiCoO_2$, the binder may be polyvinylidene fluoride, and the conductive additive may be carbon black. It should be noted that many other active materials, binders, and conductive additives are envisioned and the aforementioned compounds are illustrative only. Once the active material, binder, and conductive additives are combined to create the anode solution 129 and the cathode solution 131 slurries may be created.

The anode solution 129 and cathode solution 131 slurries may be a paste that may have a somewhat low viscosity, such that when placed on a surface the slurries may slide or roll over the edge of the surface. For example, when the solutions 129, 131 are initially created, the binder may not yet have hardened into a more solid structure and so the slurries may be very easily moved.

Once the solution 129, 131 slurries have been created, the method 300 may proceed to operation 308. In operation 308 the solutions 129, 131 may be injected or deposited into their respective solution cavities 146. That is, the anode solution 129 may be injected into the solution cavity 146 defined on the anode electrode collector 132 and the cathode solution 131 may be injected in to the solution cavity 146 defined on the cathode electrode collector 134. The solutions 129, 131 may be injected through a variety of processes, such as, but not limited to, injection molding, deposition processes, or the like.

Figure 6A:
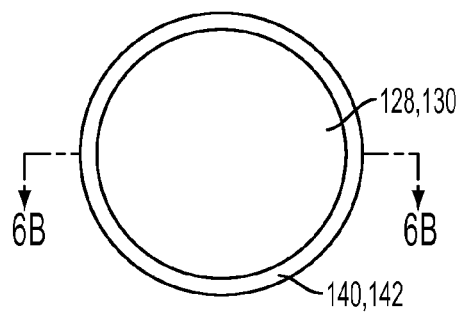
FIG. 6A is a top plan view of the electrode collector and the flow barrier with the anode or cathode solution received into the solution cavity.
Figure 6B:
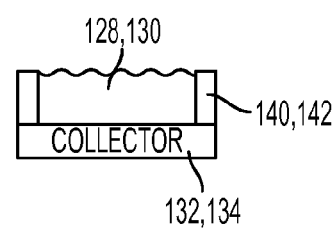
FIG. 6B is a cross-section view of the electrode collector and the flow barrier taken along line 6B-6B in FIG. 6A.

FIG. 6A is a top plan view of the anode and cathode solutions 129, 131 received into the solution cavity 146. FIG. 6B is a cross section view of the anode and cathode solutions 129, 131, respectively, received into the solution cavity 146. Referring to FIGS. 6A and 6B, the cathode 131 solution (e.g., cathode active material, binder, and conductive particles) may be injected or poured into the solution cavity 146. In some embodiments, the cathode solution 131 may be injected into the solution cavity 146 such as through injection molding, screen printing, masking, or other deposition techniques. Similarly, the anode solution 129 (e.g., anode active material, binder, and conductive particles) may be injected or poured into the respective solution cavity 146 defined on the anode electrode collector 132.

The flow barriers 140, 142 may substantially prevent the liquid or pre-hardened solutions 129, 131 from rolling or flowing off of the edges of the electrode collectors 132, 134. This is because the cathode solution 131 and/or anode solution 129 may have a somewhat low viscosity, but due to the flow barriers 140, 142 may be bound within the solution cavities. As described above with respect to operation 306, the anode and cathode solutions 129, 131 may be a slurry, paste, or otherwise have a relatively low viscosity.

With the battery core 122, the flow barriers 140, 142 may substantially contain the anode and cathode solutions 129, 131 within the well or solution cavity 146. The flow barriers 140, 142 may therefore allow the amount of anode and cathode solutions 129, 131 applied to the electrode collectors 132, 134 to be increased. As will be discussed below, the increase in solution applied may increase the thickness of either or both the anode and cathode 128, 130 layers as compared to conventional batteries. This is because the flow barriers 140, 142 may prevent the slurries from sliding off of the collector.

Figure 7A:
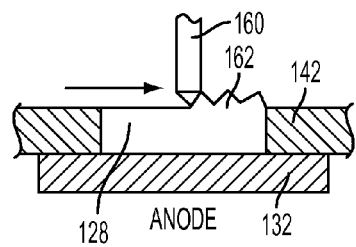
FIG. 7A is a schematic view of excess anode solution being scraped from the top of the solution cavity.
Figure 7B:
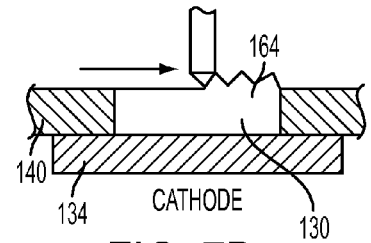
FIG. 7B is a schematic view of excess cathode solution being scraped from the top of the solution cavity.

With reference again to FIG. 4, once the anode and cathode solutions 129, 131 have been injected into or otherwise poured into the solution cavity 146, the method 300 may proceed to optional operation 309. In operation 309, excess solution 129, 131 may be removed from the solution cavity 146. In some embodiments, the anode and/or cathode solutions may be overfilled in the cavity 146. FIGS. 7A and 7B illustrate the anode and cathode, respectively, being formed during operation 309. With respect to FIGS. 7A and 7B, a blade 160 or other tool (e.g., rod, level, or laser) may be used to remove excess slurry 162, 164 from each the anode solution 129 and the cathode solution 131. For example, the excess slurry 162, 164 may be scraped off the top of the solution cavity 146 as the blade 160 extends across the top surface of the retaining barriers 140, 142.

In some embodiments, operation 309 may be used to control the thickness and/or shape of the anode and/or cathode. In other words, the blade 160 may be configured to remove a predetermined amount of solution 129, 131 which may determine the overall thickness of the anode and cathode.

Figure 8A:
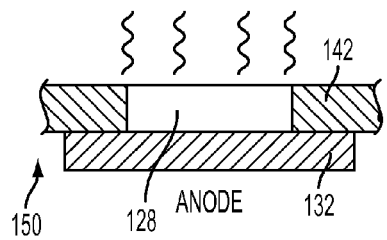
FIG. 8A is a schematic view of the anode solution being hardened within the solution cavity by being heated.
Figure 8B:
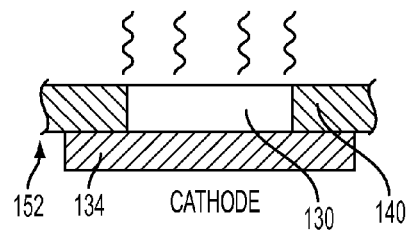
FIG. 8B is a schematic view of the cathode solution being hardened within the solution cavity by being heated.

With reference again to FIG. 4, after the excess slurry 162, 164 has been removed or the anode solution 129 and cathode solutions 131 have been otherwise shaped as desired, the method 300 may proceed to operation 310. In operation 310 the anode solution 129 and the cathode solution 131 may be cured or otherwise hardened. With respect to FIGS. 8A and 8B, in some embodiments, the anode layer 150 (including the anode solution, the anode electrode collector, and the flow barrier) and the cathode layer 152 (including the cathode solution, the cathode electrode collector, and the flow barrier) may be heated to harden the anode and cathode solutions 129, 131. For example, the anode 128 and cathode 130 (along with the respective electrode collectors) may be heated or baked to allow the binder to cure. However, the type of hardening process may depend on the type of solution used, and thus may vary as required.

In some embodiments, a nickel iron alloy such as INVAR or KOVAR may be utilized for operation 310. Alternatively, other materials having a low or particularly selected (matched) coefficient of thermal expansion (CTE), in order to maintain particular dimensions with respect to the anode and cathode solutions 129, 131 during a heating and any subsequent cooling process used to cure or hardened the anode solution 129 and/or cathode solution 131.

Returning again to FIG. 4, once the anode solution 129 and the cathode solution 131 have hardened, the method 300 may proceed to operation 312. In operation 312 it may be determined whether the flow barriers 140, 142 should be removed. In some embodiments the flow barriers 140, 142 may be removed after the cathode or anode solution has hardened. This is because once hardened the cathode or anode solution may not roll off of the electrode collector. However, in other embodiment's the material of the flow barriers 140, 142 may be selected so as to not interfere with the chemical reactions within the battery core 122 and may remain in place during use.

In instances where the flow barriers 140, 142 may be plastic or other material portions operably connected to a top surface of the electrode collectors 132, 134 (such as an O-ring or donut shape), the flow barriers 140, 142 may be removed from the sides of the anode 128 and/or cathode 130. For example, the flow barriers 140, 142 may be etched away, dissolved through a chemical reaction, or peeled or pulled away from the anode solution 129 and/or cathode solution 131. However, in some instances, the flow barriers 140, 142 may be defined by edges of the electrode collectors 132, 134 and may not be removed or may be formed of an inert material and may not generally affect the performance of the battery core 122 and thus may not be removed.

Figure 9A:
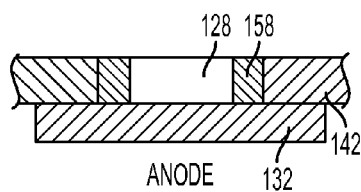
FIG. 9A is a schematic view of the anode encapsulant being formed around the anode solution.
Figure 9B:
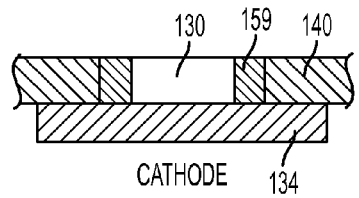
FIG. 9B is a schematic view of the cathode encapsulant being formed around the cathode solution.

If the flow barriers 140, 142 are removed, the method 300 may proceed to operation 314. In operation 314, encapsulation walls 158, 159 may be applied to the edges of the anode 128 and cathode 130. FIGS. 9A and 9B illustrate the anode and cathode as the encapsulation walls 158, 159 are added. Operation 312 may include removing the flow barrier mask (e.g., flow barrier walls) and positioning a secondary or encapsulation mask with respect to the anode or cathode layers and the collector substrate. The encapsulant 158, 159 may be a thermoplastic or other polymer deposited about the anode and cathode solutions 129,131 based on the encapsulation mask geometry.

The encapsulant 158, 159 may form a structure barrier for the two solutions 129, 131. The encapsulant 158, 159 may function as a structural retaining wall to help maintain the structure of the hardened solutions 129, 131 with the flow barriers 140, 142 removed. The encapsulant 158, 159 may also help to protect the anode and cathode. With reference to FIGS. 9A and 9B, the encapsulation 158, 159 may be deposited onto the edges of the anode and cathode solutions 129, 131 after the flow barriers 140, 142 have been removed. Alternatively, holes may be defined in the flow barriers 140, 142 which may receive the material forming the encapsulation walls 158, 159. Once the encapsulant 158 has been deposited it may need to be cured, in which case the method 300 may further including a curing time. The encapsulant 158, 159 may be cured by heating, ultraviolet radiation, or chemical means. Alternatively, a self-curing encapsulant compound may be utilized, for example an epoxy resin.

It should be noted that in some embodiments, the encapsulant 158, 159 may be provided whether the flow barriers 140, 142 are removed or not removed. Accordingly, operation 314 may be included within the process flow of the method 300 regardless of whether the flow barrier walls are removed.

Figure 10A:
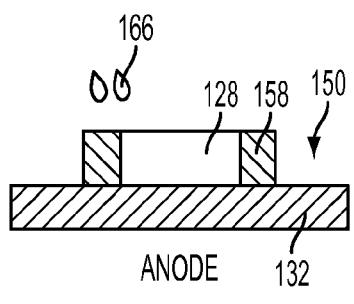
FIG. 10A is a schematic view of an electrolyte being added to the anode prior to the anode being operably connected to the cathode.

With reference again to FIG. 4, if the flow barriers 140, 142 are not removed, or after operation 314, the method 300 may proceed to operation 316. With reference to FIG. 10A, in operation 316, an electrolyte 166 may be applied. During operation 314 the method 300 may also proceed to operation 318 and the separator 136 may be added. For example, the separator 136 material may be permeable and applied to either or both the anode 128 or cathode 130 layers and the separator 136 may be saturated or permeated with the electrolyte 166 material. Alternatively, operations 316, 318 may be separate, and the electrolyte 166 may be applied as a liquid first to either the anode or cathode, and then the separator 136 may be applied. It should be noted that in operation 318, in some embodiments, additional encapsulant 158, 159 may be applied along with the separator 136 to the anode and/or cathode.

Figure 10B:
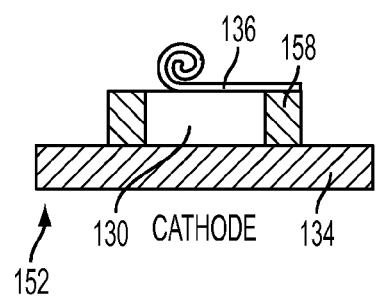
FIG. 10B is a schematic view of a separator being operably connected to the cathode prior to the cathode being operably connected to the anode.

With reference to FIG. 10B, in embodiments where the separator 136 may be a thin film, the separator 136 may be rolled onto either the anode layer 150 or the cathode layer 152. However, in other embodiments the separator 136 may be positioned on top of, deposited, or otherwise connected to one of the layers 150, 152. In some embodiments, the separators 136 may be applied to a top surface of the cathode layer 152 and may be cover a top surface of the encapsulate 158 and the cathode solution 130.

Figure 11:
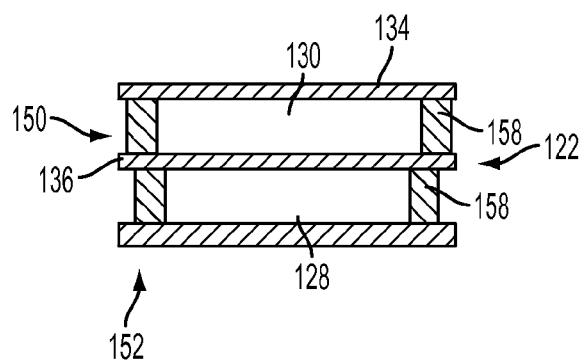
FIG. 11 is a schematic view of the assembled battery core including an anode and a cathode having an increased thickness.

Referring again to FIG. 4, once the separator 136 is in place, method 300 may proceed to operation 320. In operation 320 the anode layer 150 and cathode layer 152 may be combined together. FIG. 11 illustrates a schematic view of the battery core 122 with the two layers 150, 152 combined. With reference to FIG. 11, the cathode layer 150 may be positioned on top of the anode layer 152 with the separator 136 positioned between. Due to the flow barrier walls 140, 142, the anode 128 and the cathode 130 may have an increased thickness as compared to conventional lithium ion batteries. For example, the cathode 130 may have a thickness ranging between 10 to 25 microns. This increased thickness may provide for an increased energy density as more electrons may be stored in the anode and cathode as compared to thinner anode and cathode layers.

Additionally, because the anode 128 and cathode 130 layers may be constructed thicker, the battery core 122 may not need to be wound around itself to provide sufficient energy density for providing power to the electronic device 100. This may allow for the thickness of the anode electrode collector 132 and/or the cathode electrode collector 134 to increase in thickness. By increasing the thickness the collectors 132, 134 may be formed molded to conform to certain shapes and may help to form the flow barriers for the solutions, this will be discussed in more detail below with respect to FIG. 13.

Returning again to FIG. 4, after the anode 128 and cathode 130 have been sandwiched together, the method 300 may proceed to the end state 322 and may terminate.

Figure 12A:
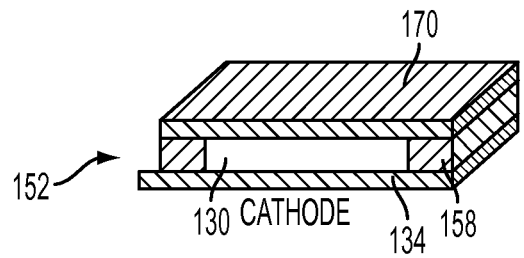
FIG. 12A is a schematic view of an alternative manufacturing operation including adding an electrolyte layer.
Figure 12B:
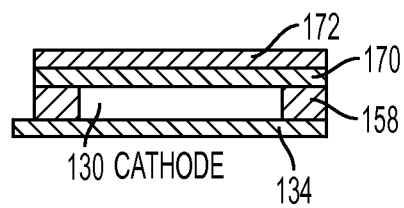
FIG. 12B is a schematic view of a lithium metal layer being applied on a top of the electrolyte layer from FIG. 12A.
Figure 12C:
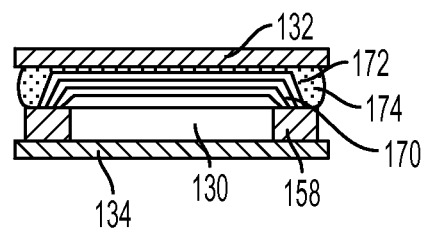
FIG. 12C is a schematic view of an alternative embodiment of the battery core including the lithium metal layer formed on top of the electrolyte layer.

In some embodiments, the cathode layer 152 as formed in FIG. 9B may be operably connected with a metal anode deposition rather than the anode solution illustrated in FIGS. 9A-11. With reference to FIGS. 12A-12C, after the cathode layer 152 has been formed as illustrated in FIG. 9B, an electrolyte layer such as lithium phosphorous oxynitride (LiPO$_x$N$_y$) may be applied to a top surface of the cathode 130 and encapsulant 158, 159. For example, once the electrolyte layer is deposited, a lithium (Li) metal layer 172 may be deposited on top of the electrolyte layer 170. FIG. 12B illustrates the Li metal layer 172 being formed on top of the electrolyte layer 170. The Li metal layer 172 may be applied as a powder deposition or a physical vapor deposition (PVD). With reference to FIG. 12C once the Li metal layer 172 is formed, the anode electrode collector 132 may be operably connected on top of the Li metal layer 172 with a flexible sealant 172 connecting the anode electrode collector 132 to the encapsulate 158.

As briefly highlighted above, because the battery core 122 may be stacked rather than rolled, due to the increased thickness of the anode and cathode layers, the electrode collectors 132, 134 or substrates may be increased in thickness. Conventional lithium ion batteries typically include electrode collectors that are a thin, flexible material (e.g., aluminum foil) so that the collectors can be wrapped around themselves when the jelly roll (e.g., rolled package of the substrate, anode, and cathode) is formed. The flexibility required for the jelly roll configuration may limit the thickness and/or materials that may be used for the battery core.

Figure 13:
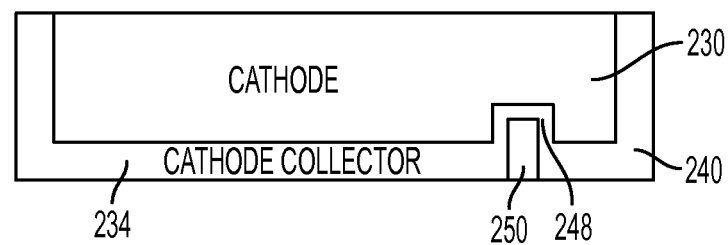
FIG. 13 is a simplified cross-section view of a cathode layer including an electrode collector molded to conform to a surface.

However, with the battery core 122 manufactured with the method 300, the increased anode 128 and cathode 130 thickness may allow for the core 122 to be stacked rather than rolled. The stacking may allow the electrode collectors 132, 134 to be thicker and/or formed of non-flexible materials, which may allow the collectors to be molded or otherwise formed as desired. FIG. 13 is simplified cross-section view of an electrode collector 234 including a surface corresponding feature. In some embodiments, either or both of the electrode collectors 132, 134 may be molded or otherwise formed to define a particular shape. For example, the electrode collectors 132, 134 may be molded to generally correspond to the bottom surface 118 of the enclosure. For example, the electrode collector 234 may be metal injection molded (MIM), machined, or otherwise formed to correspond to a desired shape.

In these embodiments, the electrode collectors 132, 134 may have an increased energy density efficiency, as the solution cavity 146 for holding the anode or cathode solutions may trace along the topography of the enclosure which may provide for the maximum amount of internal space for the solutions.

With reference to FIG. 13, the electrode collector 234 may include a surface corresponding feature 248 which may be a raised protrusion defining a protraction slot 250. In this embodiment, the protrusion slot 250 may be configured to receive a protrusion, such as a ridge or discontinuity on the bottom surface 118 (or other surface) of the enclosure 102. Rather than reducing the entire height of the electrode collector 234 and thus the amount of solution it can contain, the electrode collector 234 may include the surface corresponding feature 248 that may be raised into the solution cavity. Accordingly, although the height of the solution cavity may be reduced at the surface corresponding feature 248 (to accommodate the protrusion), the entire volume of the solution cavity may not have to substantially reduced to accommodate the protrusion.

The electrode collector 234 may be used to form either the anode electrode collector and/or the cathode electrode collector. Additionally, the electrode collector 234 may be shaped to corresponding to a number of different surfaces, dimensions, and/or shapes. For example, the electrode collector 234 may be configured to match an internal surface of the battery housing 114 versus the enclosure. Moreover, although the electrode collector 234 has been discussed as being injection molded, other forming techniques may be used.

The foregoing description has broad application. For example, while examples disclosed herein may focus on batteries for electronic devices, it should be appreciated that the concepts disclosed herein may equally apply to substantially any other type device using a portable or rechargeable power supply. Similarly, although the methods are discussed with respect to certain manufacturing techniques, the battery structures may be manufactured in other methods or techniques. Accordingly, the discussion of any embodiment is meant only to be exemplary and is not intended to suggest that the scope of the disclosure, including the claims, is limited to these examples.

We claim:

1. A method for creating a battery core, comprising:
    forming an anode solution cavity on an anode electrode collector;
    forming a cathode solution cavity on a cathode electrode collector by bending or folding edges of the cathode electrode collector to form a first flow barrier wall around a perimeter of the cathode electrode collector;
    depositing an anode solution into the anode solution cavity;
    depositing a cathode solution into the cathode solution cavity;
    curing the anode solution within the anode solution cavity; and
    curing the cathode solution within the cathode solution cavity.

2. The method of claim 1, wherein the anode solution cavity is formed by a second flow barrier wall operably connected to the anode electrode collector.

3. The method of claim 2, further comprising etching the first flow barrier wall after curing the cathode solution.

4. The method of claim 2, wherein the second flow barrier wall is formed by bending or folding a portion of the anode electrode collector.

5. The method of claim 2, wherein the second flow barrier wall is formed during an injection molding or masking process.

6. The method of claim 2, wherein the second flow barrier wall is ring-shaped.

7. The method of claim 1, further comprising encapsulating at least one of the cured anode solution or the cured cathode solution.

8. The method of claim 7, wherein said encapsulating at least one of the cured anode solution or the cured cathode solution further comprises encapsulating the at least one of the cured anode solution or the cured cathode solution utilizing at least one polymer.

9. The method of claim 1, further comprising combining the anode electrode collector and the cathode electrode collector.

10. The method of claim 9, wherein said combining the anode electrode collector and the cathode electrode collector further comprises inserting at least one separator between the anode electrode collector and the cathode electrode collector.

11. The method of claim 1, wherein at least one of the anode electrode collector or the cathode electrode collector have a shape that generally matches a surface of a device where a battery including the battery core is inserted.

12. The method of claim 11, further comprising molding the at least one of the anode electrode collector or the cathode electrode collector to have the shape.

13. The method of claim 12, wherein at least one of the anode solution cavity or the cathode solution cavity is formed during the molding.

14. The method of claim 12, wherein at least one of the anode solution cavity or the cathode solution cavity is formed after the molding.

15. The method of claim 1, wherein the anode solution cavity prevents the anode solution from flowing off at least one edge of the anode electrode collector.

16. The method of claim 1, further comprising removing at least one of excess anode solution from the anode solution cavity or excess cathode solution from the cathode solution cavity.

17. The method of claim 1, wherein at least one of said curing the anode solution or curing the cathode solution comprises at least one of heating or baking.

18. The method of claim 1, wherein the cathode solution cavity prevents the cathode solution from flowing off at least one edge of the cathode electrode collector.

19. A battery core, comprising:
    an anode electrode collector including a cured anode solution deposited in an anode solution cavity;

a cathode electrode collector, indirectly coupled to the anode electrode collector via a separator, including a cured cathode solution deposited in a cathode solution cavity; wherein:

the anode electrode collector has bent or folded edges around a perimeter of the anode electrode collector forming a first barrier flow wall around the anode solution cavity and/or the cathode electrode collector has bent or folded edges around a perimeter of the cathode electrode collector forming a second barrier flow wall around the cathode solution cavity.

* * * * *